United States Patent
Dalsgaard et al.

(10) Patent No.: US 12,410,770 B2
(45) Date of Patent: Sep. 9, 2025

(54) METHOD FOR CONTROLLING A MULTIROTOR WIND TURBINE

(71) Applicant: VESTAS WIND SYSTEMS A/S, Aarhus N. (DK)

(72) Inventors: Søren Dalsgaard, Hadsten (DK); Anders Yde Wollesen, Aarhus C (DK); Kim Hylling Sørensen, Aarhus C (DK); Julio Xavier Vianna Neto, Skødstrup (DK); Jonathan Samson, Cheshire (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/911,109

(22) PCT Filed: Mar. 8, 2021

(86) PCT No.: PCT/DK2021/050071
§ 371 (c)(1),
(2) Date: Sep. 12, 2022

(87) PCT Pub. No.: WO2021/180283
PCT Pub. Date: Sep. 16, 2021

(65) Prior Publication Data
US 2023/0120533 A1    Apr. 20, 2023

(30) Foreign Application Priority Data

Mar. 10, 2020   (DK) .......................... PA 2020 70159

(51) Int. Cl.
*F03D 7/02*       (2006.01)
*F03D 1/02*       (2006.01)

(52) U.S. Cl.
CPC ............. *F03D 7/0204* (2013.01); *F03D 1/02* (2013.01)

(58) Field of Classification Search
CPC ........ F03D 1/02; F03D 17/011; F03D 7/0204; F05B 2270/3201
See application file for complete search history.

(56) References Cited

U.S. PATENT DOCUMENTS

| 4,193,005 A * | 3/1980 | Kos ....................... F03D 7/0264 |
| | | 416/41 |
| 2018/0283355 A1 * | 10/2018 | Miranda ................... F03D 1/02 |

(Continued)

FOREIGN PATENT DOCUMENTS

| CN | 108291523 A | 7/2018 |
| CN | 108463629 A | 8/2018 |

(Continued)

OTHER PUBLICATIONS

Lee, Machine Translation of KR102275378, filed Mar. 9, 2020 (Year: 2020).*

(Continued)

*Primary Examiner* — Courtney D Heinle
*Assistant Examiner* — Michael K. Reitz
(74) *Attorney, Agent, or Firm* — Patterson + Sheridan, LLP; Gero G. McClellan (57) ABSTRACT

A method for controlling a multirotor wind turbine comprising two or more energy generating units is disclosed. At least one load carrying structure is connected to a foundation or to a tower via a yaw arrangement, and the load carrying structure carries the at least two energy generating units. A requirement to a change in operation of at least a first of the energy generating units is detected. Control commands for the first energy generating unit and for at least a second energy generating unit, mounted on the same load carrying structure, are generated. The control commands cause the required change in operation, and the control commands cause coordinated operation of at least the first energy generating unit and the second energy generating unit. The (Continued)

control commands are generated under the constraint that a yaw moment of the yaw arrangement is maintained below a predefined threshold level.

2 Claims, 7 Drawing Sheets

(56) References Cited

U.S. PATENT DOCUMENTS

| | | | | |
|---|---|---|---|---|
| 2019/0003457 | A1* | 1/2019 | Miranda | F03D 7/0296 |
| 2020/0318612 | A1 | 10/2020 | Miranda et al. | |

FOREIGN PATENT DOCUMENTS

| | | | | |
|---|---|---|---|---|
| CN | 109477456 | A | 3/2019 | |
| CN | 109667706 | A | 4/2019 | |
| EP | 2703643 | A1 | 3/2014 | |
| EP | 2955370 | A1 | 12/2015 | |
| EP | 3256723 | A1 | 12/2017 | |
| EP | 3377757 | A1 | 9/2018 | |
| EP | 3473846 | A1 * | 4/2019 | F03D 1/02 |
| EP | 3591218 | A1 | 1/2020 | |
| KR | 20190098499 | A * | 8/2019 | F03D 1/02 |
| KR | 102275378 | * | 3/2020 | |
| WO | WO-2018157897 | A1 * | 9/2018 | |
| WO | WO-2019034218 | A1 * | 2/2019 | |
| WO | 2019120419 | A1 | 6/2019 | |
| WO | 2021180283 | A1 | 9/2021 | |

OTHER PUBLICATIONS

Eom Seung Man, Machine Translation of KR20190098499, Aug. 22, 2019 (Year: 2019).*
European Patent Office, Communication pursuant to Article 94(3) EPC for Application 21 713 574.8-1002 dated Aug. 1, 2023.
Danish Patent and Trademark Office, 1st Examination Including the Search Report for Application PA 2020 70159 dated Aug. 27, 2020.
PCT, International Search Report for Application PCT/DK2021/050071 dated Oct. 6, 2021.
PCT, Written Opinion of the International Searching Authority for Application PCT/DK2021/050071 dated Oct. 6, 2021.
Hao, C. "Innovation and Appreciation Dual Wind Wheel Variable Speed Wind Turbine", Mechanical and Electrical Product Development and Innovation, vol. 32, issue 5, Sep. 28, 2019, pp. 14-17.
Office Action received for Chinese Application No. 202180028943.3, mailed on Feb. 24, 2025, 15 pages (7 pages of English Translation and 8 pages of Original Document).

* cited by examiner

Fig. 7

METHOD FOR CONTROLLING A MULTIROTOR WIND TURBINE

FIELD OF THE INVENTION

The present invention relates to method for controlling a multirotor wind turbine, i.e. a wind turbine comprising two or more energy generating units. More particularly, the method according to the present invention reduces uneven loads on the wind turbine, in particular on parts of a yaw arrangement.

BACKGROUND OF THE INVENTION

When the wind acts on wind turbine blades of an energy generating unit of a wind turbine, thereby causing a rotor of the energy generating unit to rotate, loads are introduced on the wind turbine, e.g. due to a thrust acting on the energy generating unit.

In the case that the wind turbine is a multirotor wind turbine, i.e. in the case that the wind turbine comprises two or more energy generating units, the loads on the energy generating units may not be the same. This could, e.g., be due to a difference in the wind acting on the energy generating units, e.g. due to wind shear, partial wake, etc. Alternatively or additionally, a difference in loads on the energy generating units may arise from a difference in operation of the energy generating units.

In the case that at least two energy generating units are mounted on parts of a load carrying structure which extend away from a yaw arrangement on opposing sides of a rotation axis of the yaw arrangement, differences in loads as described above may introduce uneven loads in the wind turbine, notably in the yaw arrangement, and possibly in a tower and/or a foundation of the wind turbine. In the case that such loads are taken into account at the design phase of the wind turbine, some of the components of the wind turbine may be costly to manufacture, e.g. due to additional material added in order to withstand the expected loads. In the case that such loads are not taken into account at the design phase of the wind turbine, there is a risk that design loads of the wind turbine may be exceeded, thereby risking damage to some of the components of the wind turbine.

DESCRIPTION OF THE INVENTION

It is an object of embodiments of the invention to provide a method for controlling a multirotor wind turbine, in which excessive uneven loads on the wind turbine are avoided.

The invention provides a method for controlling a multirotor wind turbine, the multirotor wind turbine comprising two or more energy generating units, each energy generating unit comprising a rotor comprising one or more wind turbine blades, and at least one load carrying structure, the load carrying structure being connected to a foundation or to a tower via a yaw arrangement, and the load carrying structure carrying the at least two energy generating units, the method comprising the steps of:

detecting a requirement to a change in operation of at least a first of the energy generating units, generating control commands for the first energy generating unit and for at least a second energy generating unit, the first energy generating unit and the second energy generating unit being mounted to the same load carrying structure, the control commands causing the required change in operation, and the control commands causing coordinated operation of at least the first energy generating unit and the second energy generating unit, and controlling the energy generating units in accordance with the generated control commands, wherein the control commands are generated under the constraint that a yaw moment of the yaw arrangement is maintained below a predefined threshold level.

Thus, the method according to the invention is a method for controlling a multirotor wind turbine, i.e. a wind turbine which comprises two or more energy generating units. Each energy generating unit comprises a rotor with one or more wind turbine blades. Accordingly, for each energy generating unit, the wind turbine blades are able to catch the wind and thereby cause the rotor to rotate. The rotational movements of the rotor can then be converted into electrical energy. Thus, each of the energy generating units is capable of individually producing electrical energy by extracting energy from the wind.

The multirotor wind turbine further comprises at least one load carrying structure. The load carrying structure is connected to a foundation or to a tower of the wind turbine via a yaw arrangement. Thereby the load carrying structure is capable of performing yawing movements relative to the foundation or the tower. Furthermore, the load carrying structure carries at least two energy generating units. Accordingly, when the load carrying structure performs yawing movements relative to the foundation or the tower, the energy generating units carried by the load carrying structure move along. Thereby the rotors of the energy generating units are oriented in accordance with the direction of the incoming wind in a synchronous manner.

In the method according to the invention, a requirement to a change in operation of at least a first of the energy generating units is initially detected. The required change in operation may be occasioned by a change in ambient conditions, such as wind speed, wind direction, wake conditions, turbulence conditions, etc. Alternatively or additionally, the required change in operation may be occasioned by events related to the energy generating unit and/or by events related to the entire multirotor wind turbine. This will be described in further detail below.

Next, control commands are generated for the first energy generating unit and for at least a second energy generating unit. The first energy generating unit and the second energy generating unit are mounted on the same load carrying structure, i.e. they are connected to the foundation or the tower via the same yawing arrangement. The generated control commands cause the required change in operation, i.e. it is ensured that the first energy generating unit is in fact obtaining the required change in operation.

Furthermore, the generated control commands cause coordinated operation of at least the first energy generating unit and the second energy generating unit. Thereby, the control commands for the second energy generating unit are generated in dependence of the control commands generated for the first energy generating unit. Furthermore, while the control commands for the first energy generating unit must ensure that the required change in operation is obtained, it is also ensured that the control commands for the first energy generating unit are not in conflict with requirements of the second energy generating unit.

Finally, the energy generating units are controlled in accordance with the generated control commands. Thereby the first energy generating unit is controlled in a manner which causes the required change in operation, and the first energy generating unit and the second generating unit are controlled in a coordinated manner.

The control commands are further generated under the constraint that a yaw moment of the yaw arrangement is maintained below a predefined threshold level. In the present context the term 'yaw moment' should be interpreted to mean a moment about an axis coinciding with the rotation axis of the yaw arrangement.

In the case that two energy generating units carried by the same load carrying structure are operated independently of each other, there is a risk that the combined operation of the energy generating units may result in different forces acting on opposing sides of a rotation axis of the yaw arrangement. This may introduce an undesired yaw moment in the yaw arrangement, and potentially undesired torsional tower loads. If such a yaw moment becomes too high, there is a risk of introducing uneven loads in the wind turbine, notably in the yaw arrangement. By generating the control commands for the energy generating units under the constraint that the yaw moment of the yaw arrangement is maintained below a predefined threshold value, it is ensured that operating the energy generating units in accordance with the generated control commands will not result in undesired uneven loads.

The predefined threshold value may be a fixed value which defines a level beyond which there is a risk that the yaw moment will cause undesired high uneven loads under any circumstances. As an alternative, the predefined threshold value may be selected in dependence on the given circumstances, such as wind speed, wind direction including wake conditions associated therewith, gust conditions, turbulence conditions, operational state of the energy generating units and/or the multirotor wind turbine, etc. For instance, the predefined threshold value may be selected in such a manner that the yaw moment is kept within bounds for a set of design conditions for the energy generating units and/or for the multirotor wind turbine. Furthermore, one predefined threshold value may be selected when the load carrying structure is not actively performing yawing movements, while another threshold value may be selected during yawing. In this case the threshold value may further be selected in dependence on the yawing speed and/or the yawing acceleration.

The load carrying structure may comprise two arm structures extending away from the yaw arrangement on opposing sides of a rotation axis of the yaw arrangement, and the first energy generating unit may be mounted to a first arm structure and the second energy generating unit is mounted to a second arm structure.

According to this embodiment, the first energy generating unit and the second energy generating unit are mounted on opposing sides of the rotation axis of the yaw arrangement. Furthermore, since the energy generating units are mounted on the arms, which are extending away from the yaw arrangement, they are also arranged at positions which are displaced from the rotation axis. The further away from the rotation axis the energy generating units are positioned, the higher the risk that they may cause a high yaw moment in the yaw arrangement. Therefore, in this case it is particularly relevant to operate the energy generating units in a coordinated manner which ensures that the yaw moment is maintained below the predefined threshold value.

The step of detecting a requirement to a change in operation of at least the first energy generating unit may comprise detecting a change in operational conditions of the first energy generating unit. This could, e.g., include the first energy generating unit detecting an event, such as an extreme change in wind direction, a change in turbulence conditions, a change in wind shear, a change in thrust impact on the energy generating unit, etc. As an alternative, it could include the first energy generating unit changing operational state, such as changing to an idle state, a normal production state, a shut down state, a start up state, a defensive operation state, a derated state, from one speed region to another, e.g. in order to avoid resonances, etc.

Thus, according to this embodiment, the requirement to a change in operation is occasioned by something which is detectable at the first energy generating unit.

The step of generating control commands may comprise setting identical thrust limits for the first energy generating unit and the second energy generating unit. The thrust acting on the energy generating units has a high impact on the yaw moment of the yaw arrangement, in particular when the energy generating units are arranged on arms extending away from the yaw arrangement. Therefore setting identical thrust limits for the first energy generating unit and the second energy generating unit is an efficient way of ensuring that the difference in thrust acting on the two energy generating units is minimised, and that the introduced yaw moment is therefore also minimised.

As an alternative, the step of detecting a requirement to a change in operation of at least the first energy generating unit may be performed based on a command requesting a change in operation of the multirotor wind turbine. This could, e.g., be occasion by a change in operating conditions, such as a requirement to derate power production, derate rotational speed of the rotors, starting the wind turbine, stopping the wind turbine, etc. Thus, according to this embodiment, the requirement to a change in operation relates to the overall operation of the entire wind turbine. The wind turbine then generates control commands to each of the energy generating units which ensure that the overall operational requirements of the wind turbine are fulfilled, while ensuring that the yaw moment of the yaw arrangement is maintained below the predefined threshold level.

The step of generating control commands may comprise generating identical control commands for the first energy generating unit and for the second energy generating unit. According to this embodiment, it is ensured that the first energy generating unit and the second energy generating unit are controlled in the same manner. For instance, if the first energy generating unit receives a control command causing it to shut down, then the second energy generating unit also receives a control command causing it to shut down.

Alternatively, the step of generating control commands may comprise generating a first control command for the first energy generating unit and a second control command for the second energy generating unit, the second control command differing from the first control command, and the step of controlling the energy generating units may comprise controlling the first energy generating unit and the second energy generating unit in accordance with different control commands in a coordinated manner.

According to this embodiment, the first energy generating unit and the second energy generating unit are not controlled in an identical manner. However, the control of the energy generating units is still coordinated in order to maintain the yaw moment of the yaw arrangement below the predefined threshold value.

For instance, the step of generating control commands may comprise:

generating a first control command for the first energy generating unit, the first control command causing the first energy generating unit to shut down, and generating a second control command for a second energy generating unit, the second control command causing the second energy generating unit to continue power production at a reduced load level.

According to this embodiment, the requirement to a change in operation is a requirement to shut down the first energy generating unit. Accordingly, the control commands generated for the first energy generating unit must cause the first energy generating unit to shut down. However, shutting down one energy generating unit mounted on a load carrying structure on a first side of the rotation axis of the yaw arrangement, while allowing another energy generating unit, mounted on the load carrying structure on an opposite side of the rotation axis of the yaw arrangement to continue operating fully, may give rise to a significant yaw moment in the yaw arrangement, due to a significantly larger thrust acting on the operating energy generating unit than on the energy generating unit shutting down, e.g. due to the rotational speed of the rotor and/or a difference in pitch angle among the energy generating units. In order to avoid this, according to this embodiment, the control commands generated for the second energy generating unit cause the second energy generating unit to continue operating, but at a reduced load level, e.g. by reducing power production below a predefined threshold level. This reduces the difference in thrust acting on the two energy generating units to a level which ensures that the yaw moment on the yaw arrangement is maintained below the predefined threshold level. However, the second energy generating unit is not shut down. Thereby the wind turbine continues producing energy during the shutdown of the first energy generating unit. Furthermore, a start-up of the second energy unit is not required when the first energy generating unit is once again ready to start up.

The control commands to reduce power production of the second energy generating unit may include control commands to reduce the rotational speed of the rotor, to reduce a thrust limit for the energy generating unit, to derate the energy generating unit, etc.

In the case that the first energy generating unit is required to shut down during operating conditions which cause high loads on the wind turbine, e.g. in case of high wind speeds, then the control commands for the second energy generating unit may introduce a delay before the control commands for the second energy generating unit are executed. According to this embodiment, the first energy generating unit may be shut down immediately when it is established that this is required. However, in the case that the first energy generating unit is the one which provides the largest contribution to the yaw moment, it is desirable to allow the first energy generating unit to slow down before the second energy generating unit also starts shutting down, because otherwise an increase in yaw moment may occur. Therefore, a delay is introduced before the second energy generating unit is allowed to execute its control commands.

According to another embodiment, the control commands for the first energy generating unit may cause the first energy generating unit to move to an idle state, and the control commands for the second energy generating unit may cause the second energy generating unit to reduce power production, reduce a thrust limit, reduce a rotational speed of the rotor and/or derate the energy generating unit, etc.

The coordinated operation of the first energy generating unit and the second energy generating unit may be a time coordinated operation. According to this embodiment, the control commands for the first energy generating unit and the control commands for the second energy generating unit are executed simultaneously, or with a well defined timing there between.

The method may further comprise the step of monitoring a yaw moment of the yaw arrangement, and the step of generating control commands may be performed based on the yaw moment, and the control commands for the second energy generating unit may provide instructions to control the second energy generating unit in accordance with the control commands when the yaw moment is below the predefined threshold level.

According to this embodiment, the yaw moment is monitored, e.g. in order to ensure that it is actually maintained below the predefined threshold level. When this is the case, the second energy generating unit is allowed to operate in accordance with the generated control commands. On the other hand, when the yaw moment increases above the predefined threshold level, then it might not be feasible to execute the control commands generated for the second energy generating unit immediately. For instance, a delay may instead be introduced before the control commands for the second energy generating unit are executed, as described above. For instance, in the case that the second energy generating unit is the one which provides the smallest contribution to the yaw moment, then shutting down this energy generating unit may cause an increase in yaw moment, and it may therefore be desirable to delay shutting down of this energy generating unit until shutting down the first energy generating unit has decreased the yaw moment to an acceptable level.

The method may further comprise the steps of:
monitoring operation of the energy generating units during operation in accordance with the generated control commands, and
adjusting operation of at least one of the energy generating units in the case that time coordination of operation of the first energy generating unit and the second energy generating unit is lost.

According to this embodiment, once the control commands for the first energy generating unit and the second energy generating unit have been generated, in response to a requirement to a change in operation, and the first energy generating unit and the second energy generating unit are controlled in a coordinated manner in accordance with the generated control commands, the actual operation of the energy generating units is monitored in order to ensure that the energy generating units actually continue to operate in a coordinated manner.

In the case that it is revealed that time coordination of operation of the first energy generating unit and the second energy generating unit is lost, then the operation of at least one of the energy generating units is adjusted in order to ensure that the time coordination is restored, and that the yaw moment on the yaw arrangement can be maintained below the predefined threshold level.

Loss of the time coordination of operation of the energy generating units may, e.g., be caused by differences in the manner in which the energy generating units execute the control commands. For instance, even if the first energy generating unit as well as the second energy generating unit is requested to shut down, and even if the shut-down processes are initiated simultaneously, the actual shut-down processes may not be performed identically or at the same pace by the two energy generating units. In this case it may be necessary to adjust the operation of at least one of the energy generating units, e.g. requesting an energy generating unit being ahead of the other energy generating unit to slow down the shut-down process or the like, in order to allow the other energy generating unit to catch up.

The step of detecting a requirement to a change in operation may be performed by one of the energy generating units. According to this embodiment, the requirement to a change in operation is detected locally by one of the energy generating units, preferably the one which requires a change in operation. This could, e.g., include the energy generating unit detecting a change in ambient conditions, such as wind speed, wind direction, gust conditions, turbulence conditions, etc. Alternatively or additionally, it may include the energy generating unit detecting an internal condition, e.g. based on an output from a sensor, such as a temperature sensor, a load sensor, etc.

As an alternative, the step of detecting a requirement to a change in operation may be performed by the multirotor wind turbine. According to this embodiment, the requirement to a change in operation relates to the entire wind turbine, and it is therefore detected on wind turbine level. For instance, the wind turbine as such may be required to derate, increase power production, shut down, start up, etc., and this needs to be executed in a manner which ensures coordination among the energy generating units, as described above.

The step of detecting a requirement to a change in operation may comprise detecting that the first energy generating unit is to shut down. This has already been described above.

In this case, the step of generating control commands may comprise generating control commands causing the first energy generating unit as well as the second energy generating unit to shut down. Thereby it is efficiently prevented that one energy generating unit is shut down while the other continues operating normally. As described above, such a scenario may cause high yaw moments, and it is therefore desirable to avoid this.

Similarly, the step of detecting a requirement to a change in operation may comprise detecting that the first energy generating unit is to start up. In this case, the step of generating control commands may comprise generating control commands causing the first energy generating unit as well as the second energy generating unit to start up. Thereby it is ensured that the energy generating units are started up simultaneously, or at least in a coordinated manner, thereby efficiently ensuring that the yaw moment on the yaw arrangement is maintained below the predefined threshold level during the start up process.

The step of generating control commands may comprise generating control commands causing the first energy generating unit as well as the second energy generating unit to start up in a load reduced operating mode. Thereby it is ensured that the loads on the wind turbine are maintained at a low level during the start up of the energy generating units, even if the energy generating units are not performing the start up in exactly identical manners.

As another alternative, the step of detecting a requirement to a change in operation may comprise detecting that the first energy generating unit is to derate. In this case, the step of generating control commands may comprise generating control commands causing the first energy generating unit as well as the second energy generating unit to derate.

It should be noted that the coordinated control of the energy generating units may be initiated based on a prediction of conditions expected to occur at the position of the wind turbine during a future time interval. The prediction may, e.g., be based on a set of monitored parameters. In the case that the predicted conditions indicate that a change in operation of at least one of the energy generating units will be required when the future time interval is reached, then measures may be taken in advance in order to avoid undesired incidents.

BRIEF DESCRIPTION OF THE DRAWINGS

The invention will now be described in further detail with reference to the accompanying drawings in which.

DETAILED DESCRIPTION OF THE DRAWINGS

Figure 1:
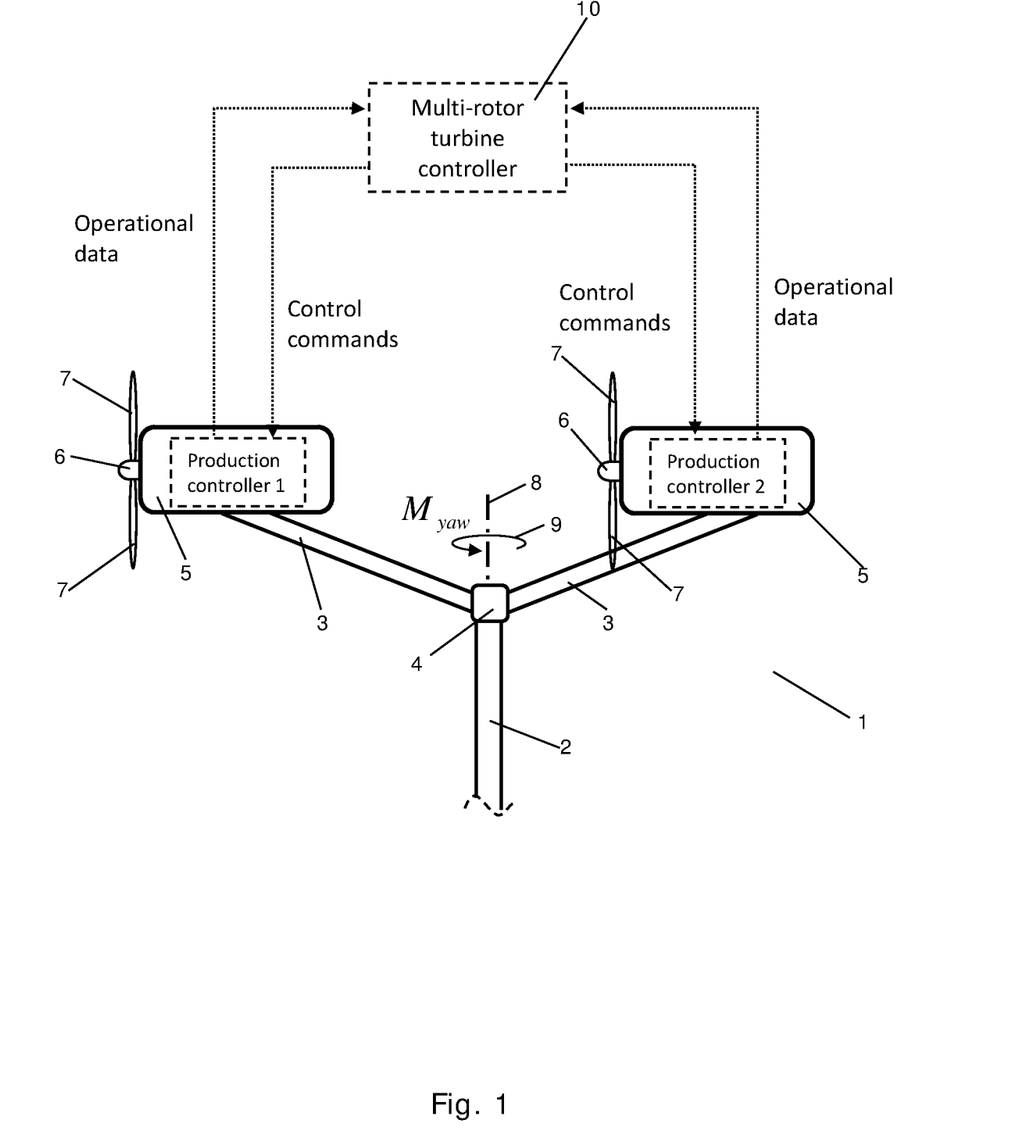
FIG. 1 is a diagrammatic view of a multirotor wind turbine being controlled in accordance with a method according to an embodiment of the invention.

FIG. 1 is a diagrammatic view of a multirotor wind turbine 1 being controlled in accordance with a method according to an embodiment of the invention. The wind turbine 1 comprises a tower 2 and a load carrying structure comprising two arms 3. The load carrying structure 3 is connected to the tower 2 via a yaw arrangement 4, and thereby the load carrying structure 3 is capable of performing yawing movements relative to the tower 2.

Each of the arms carries an energy generating unit 5, each energy generating unit 5 comprising a rotor 6 and a number of wind turbine blades 7. The arms 3 extend away from the yaw arrangement 4 on opposite sides of a rotation axis 8 of the yaw arrangement 4. Thereby differences in operation of the two energy generating units 5 may result in different forces being applied to the load carrying structure 3 on opposing sides of the rotation axis 8 of the yaw arrangement 4. This may introduce a yaw moment 9 in the yaw arrangement 4.

The multirotor wind turbine 1 of FIG. 1 may be controlled in the following manner. During operation, the energy generating units 5 provide operational data to a multirotor wind turbine controller 10. In the case that it is detected that a change in operation of at least one of the energy generating units 5 is required, the multirotor wind turbine controller 10 generates control commands for both of the energy generating units, and provides the generated control commands to the respective energy generating units 5.

The change in operation may be required due to events or conditions occurring or being detected at the energy generating units 5. In this case the multirotor wind turbine controller 10 may react based on the operational data received from the energy generating units 5. Alternatively or additionally, the change in operation may be required due to events or conditions applying at wind turbine level. In this case the multirotor wind turbine controller 10 may react based on other input and/or measurements performed by the multirotor wind turbine controller 10 itself.

The control commands are generated in such a manner that it is ensured that the required change in operation is in fact obtained. Furthermore, the control commands are generated in a coordinated manner, i.e. in such a way that the two energy generating units 5 are caused to operate in a coordinated manner, in order to ensure that the yaw moment 9 of the yaw arrangement 4 is maintained below a predefined threshold level.

Figure 2:
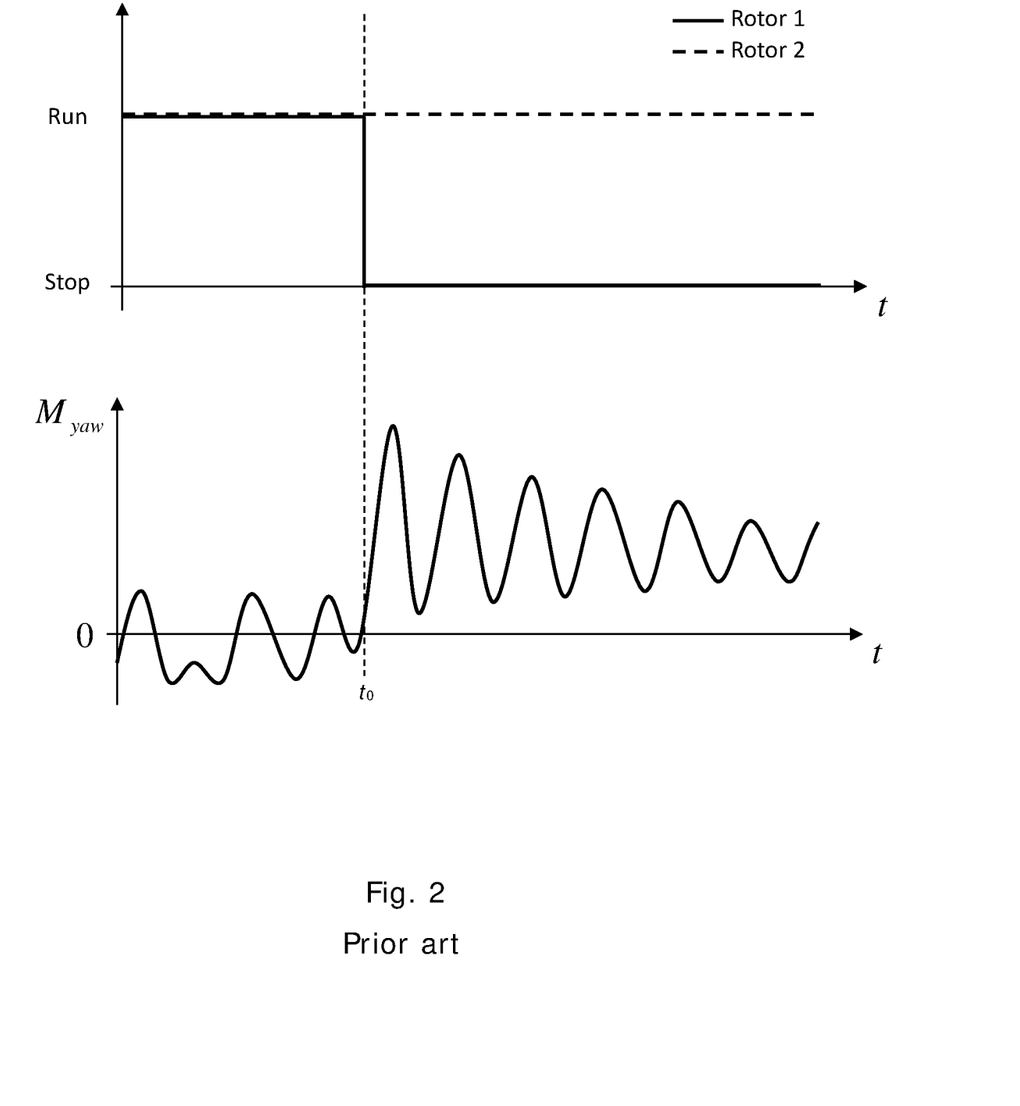
FIGS. 2 and 3 illustrate control of a multirotor wind turbine during shut down in accordance with a prior art method and a method according to an embodiment of the invention, respectively.
Figure 3:
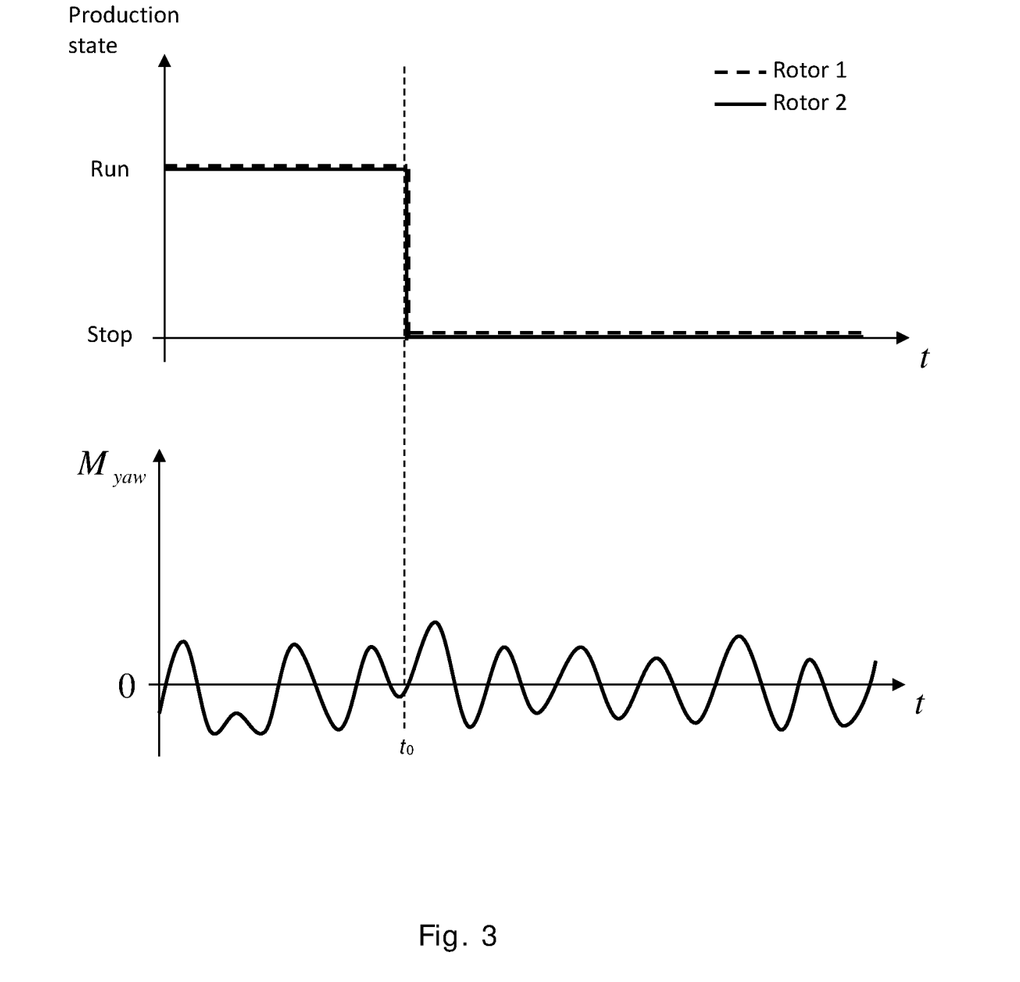

FIGS. 2 and 3 illustrate control of a multirotor wind turbine during shut down in accordance with a prior art method and a method according to an embodiment of the invention, respectively. The multirotor wind turbine being controlled could, e.g., be the multirotor wind turbine of FIG. 1. In any event, the multirotor wind turbine comprises two energy generating units, illustrated by a solid line and a dashed line, respectively.

The upper graph illustrates operating states of the energy generating units as a function of time. It can be seen that the energy generating units can be in a 'Run' state, in which the energy generating units operate, or in a 'Stop' state, in which the energy generating units have been shut down.

The lower graph illustrates a yaw moment of the yaw arrangement of the multirotor wind turbine as a function of time, and during the operation of the energy generating units illustrated in the upper graph.

At time $t_0$, it is detected that a first one of the energy generating units is required to shut down. In the prior art method illustrated in FIG. 2, the first energy generating unit, illustrated by the solid line, is switched from the 'Run' state to the 'Stop' state in order to shut down the energy generating unit, and thereby fulfil the requirement. However, the second energy generating unit, illustrated by the dashed line, remains in the 'Run' state, and thereby continues to operate as before the requirement to shut down the first energy generating unit was detected. It can be seen that this results in a high yaw moment on the yaw arrangement, as well as in large variations in the yaw moment.

In the method according to an embodiment of the invention illustrated in FIG. 3, the first energy generating unit is also switched from the 'Run' state to the 'Stop' state, in order to shut down the first energy generating unit as required. However, in this case the control commands generated for the two energy generating units are coordinated, and therefore the second energy generating unit is also switched from the 'Run' state to the 'Stop' state, simultaneously with the first energy generating unit. It can be seen from the lower graph of FIG. 3 that this results in a much lower yaw moment, as well as in much smaller variations in the yaw moment. Thereby the loads on the wind turbine, in particular on the yaw arrangement, are significantly reduced as compared to the prior art case illustrated in FIG. 2.

Figure 4:
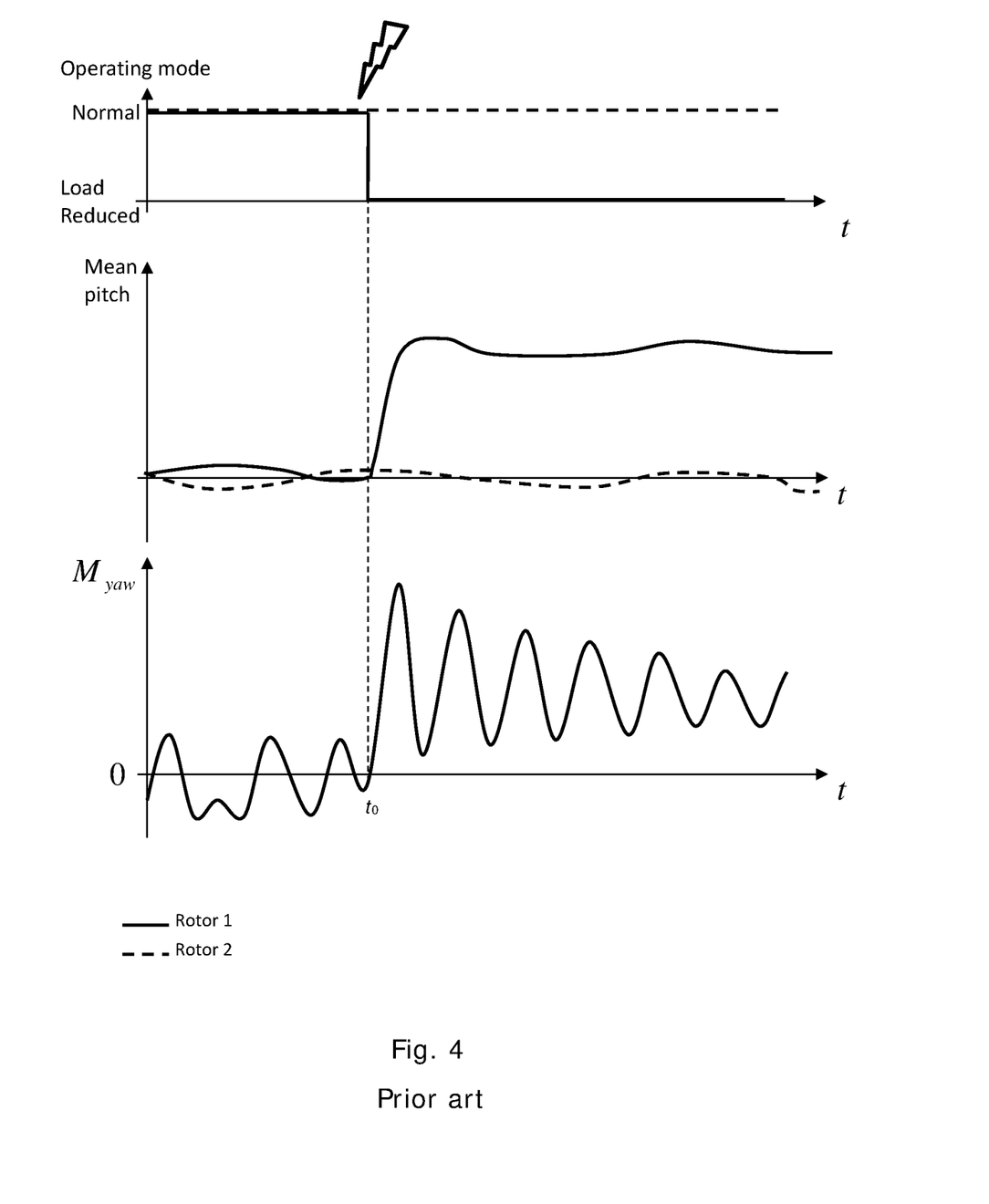
FIGS. 4 and 5 illustrate control of a multirotor wind turbine following an event detection in accordance with a prior art method and a method according to an embodiment of the invention, respectively.
Figure 5:
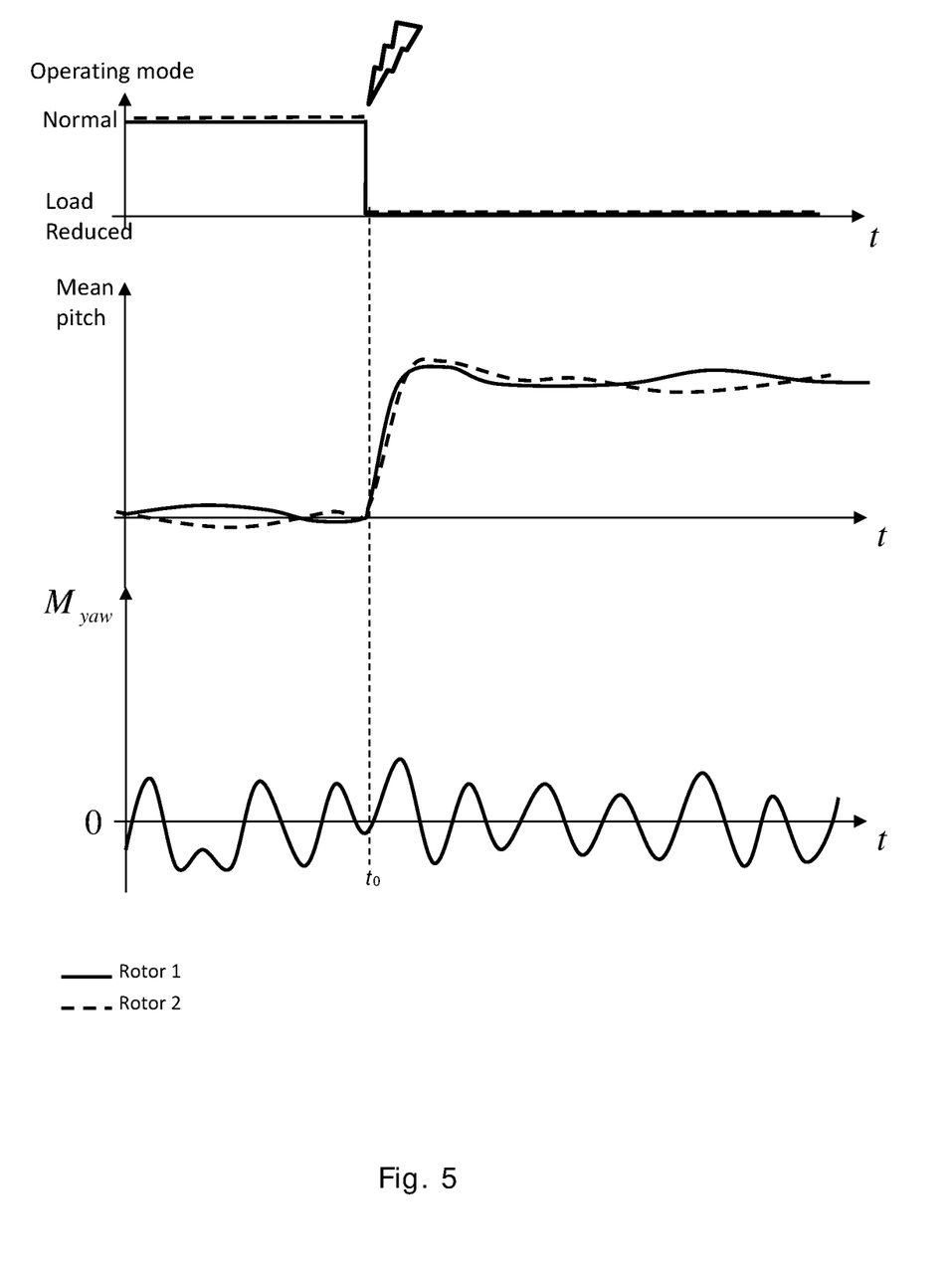

FIGS. 4 and 5 illustrate control of a multirotor wind turbine following an event detection in accordance with a prior art method and a method according to an embodiment of the invention, respectively. Similarly to the situation described above with reference to FIGS. 2 and 3, the multirotor wind turbine comprises two energy generating units, i.e. a first energy generating unit illustrated by a solid line and a second energy generating unit illustrated by a dashed line.

The upper graph illustrates operating states of the energy generating units as a function of time. The energy generating units can be in a 'Normal' state, in which the energy generating units operate normally, and in a 'Load reduced' state, in which the energy generating units are operated in a cautious manner which limits the loads introduced on the energy generating units, and thereby on the multirotor wind turbine.

The middle graph illustrates a mean pitch angle of the wind turbine blades of the energy generating units as a function of time, and during the operation of the energy generating units illustrated in the upper graph.

The lower graph illustrates a yaw moment of the yaw arrangement of the multirotor wind turbine as a function of time, and during the operation of the energy generating units illustrated in the upper graph.

At time $t_0$ it is detected that an event has occurred which requires that the first energy generating unit operates in a load reducing manner. In the prior art method, illustrated in FIG. 4, the first energy generating unit is switched from the 'Normal' state to the 'Load reduced' state as required. In consequence thereof, the mean pitch angle of the first energy generating unit is increased. However, the second energy generating unit remains in the 'Normal' state, and continues to operate without taking the operation of the first energy generating unit into account. Accordingly, the mean pitch angle of the second energy generating unit remains at the level which it was at prior to $t_0$. It can be seen from the lower graph of FIG. 4 that this results in a high yaw moment being introduced in the yaw arrangement, as well as in large variations in the yaw moment, caused by a rapid change in yaw moment.

In the method according to an embodiment of the invention illustrated in FIG. 5, the first energy generating unit is also switched from the 'Normal' state to the 'Load reduced' state at time $t_0$. However, in this case, the second energy generating unit is also switched from the 'Normal' state to the 'Load reduced' state at time $t_0$. Therefore, the mean pitch angle of the second energy generating unit is increased to a level which is comparable to the mean pitch angle of the first energy generating unit.

It can be seen from the lower graph of FIG. 5 that this results in a much lower yaw moment, as well as in much smaller variations in the yaw moment. Thereby the loads on the wind turbine, in particular on the yaw arrangement, are significantly reduced as compared to the prior art case illustrated in FIG. 4.

Figure 6:
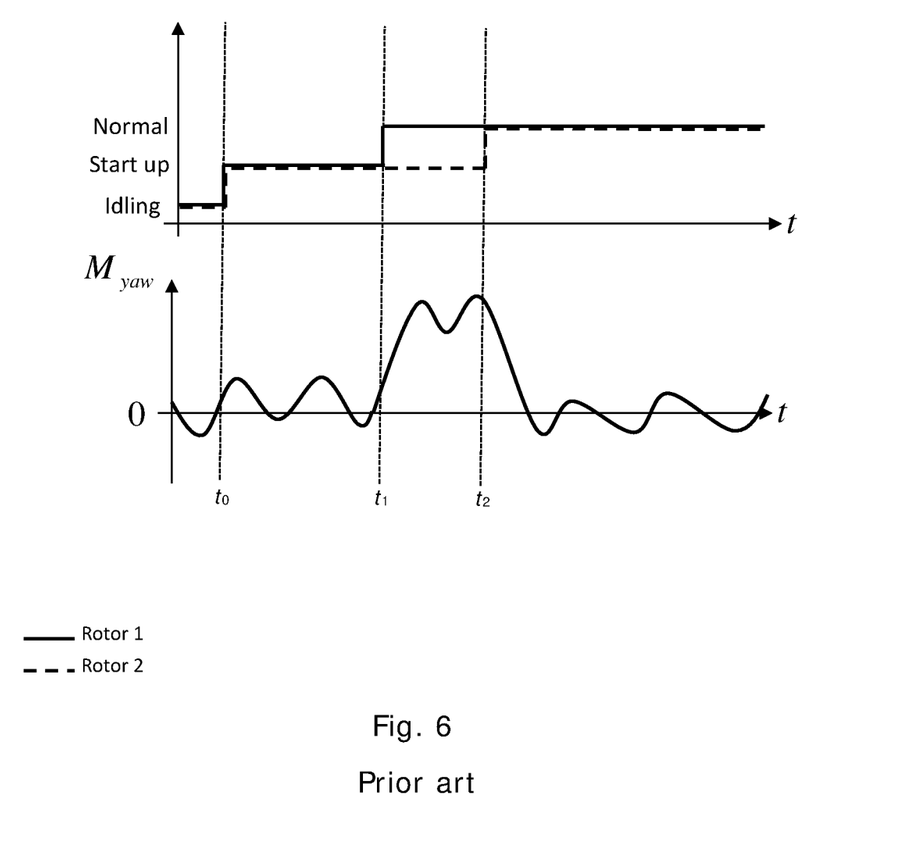
FIGS. 6 and 7 illustrate control of a multirotor wind turbine during start up in accordance with a prior art method and a method according to an embodiment of the invention, respectively.
Figure 7:
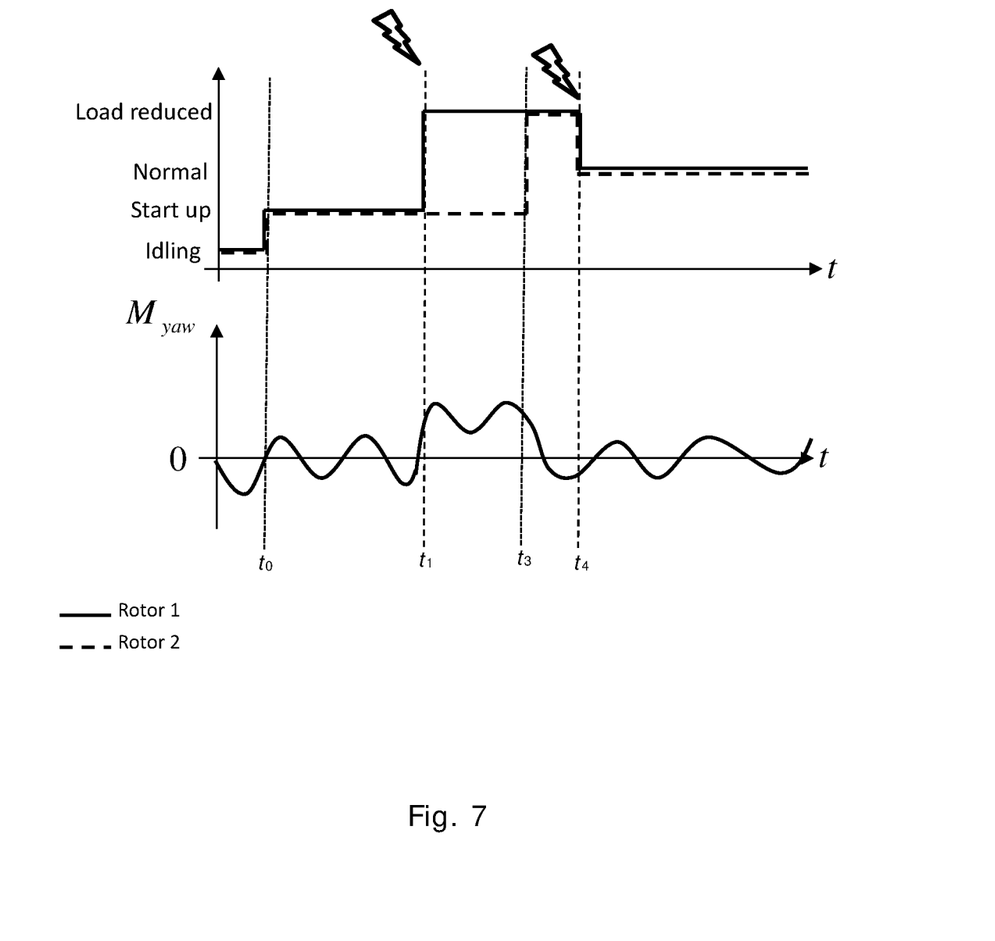

FIGS. 6 and 7 illustrate control of a multirotor wind turbine during start up in accordance with a prior art method and a method according to an embodiment of the invention, respectively. Similarly to the situation described above with reference to FIGS. 2 and 3, the multirotor wind turbine comprises two energy generating units, i.e. a first energy generating unit illustrated by a solid line and a second energy generating unit illustrated by a dashed line.

The upper graph illustrates operating states of the energy generating units as a function of time. The energy generating units can be in a 'Load reduced' state, in which the energy generating units are operated in a cautious manner, a 'Normal' state, in which the energy generating units are operating in a normal manner, a 'Start up' state, in which the energy generating units are being started up, and an 'Idling' state, in which the energy generating units are not producing power.

The lower graph illustrates a yaw moment of the yaw arrangement of the multirotor wind turbine as a function of time, and during the operation of the energy generating units illustrated in the upper graph.

Initially both of the energy generating units are in the 'Idling' state, i.e. none of the energy generating units is producing power. At time $t_0$, it is detected that the energy generating units should start up. Accordingly, both of the energy generating units are switched from the 'Idling' state to the 'Start up' state. At time $t_1$ the first energy generating unit has completed its start up process, and it is therefore ready to start operating normally. However, the second energy generating unit has not yet completed its start up process.

In the prior art method, illustrated in FIG. 6, the first energy generating unit is switched from the 'Start up' state to the 'Normal' state at time $t_1$, while the second energy generating unit simply remains in the 'Start up' state until it has completed its start up process. This is obtained at time $t_2$, where the second energy generating unit is switched from the 'Start up' state to the 'Normal' state, after which both of the energy generating units operate normally.

It can be seen from the lower graph of FIG. 6 that this results in a high yaw moment in the yaw system during the time where the first energy generating unit is operating normally, while the second energy generating unit is still in the process of starting up, i.e. from time $t_1$ to time $t_2$.

In the method according to an embodiment of the invention illustrated in FIG. 7, the operation of the two energy generating units is coordinated. Accordingly, when the first energy generating unit has completed its start up process at time $t_1$, it is taken into account that the second energy generating unit has not yet completed its start up process. Therefore, instead of switching the first energy generating unit to the 'Normal' state it is switched to the 'Load reduced' state, where the loads acting on the energy generating unit are lower. Thereby the difference in forces acting on the two energy generating units is reduced.

When the second energy generating unit has completed its start up process, at time $t_3$, it is also switched from the 'Start up' state to the 'Load reduced' state, and both of the energy generating units are now operating in a cautious manner.

When operation of both energy generating units is stable, they are both switched from the 'Load reduced' state to the 'Normal' state, in a coordinated manner, at time $t_4$.

It can be seen from the lower graph of FIG. 7, that this results in a low yaw moment on the yaw arrangement throughout the entire start up process of the multirotor wind turbine.

The invention claimed is:

1. A multirotor wind turbine, comprising:
   a tower;
   two or more energy generating units, each energy generating unit comprising a rotor comprising one or more wind turbine blades;
   at least one load carrying structure, the load carrying structure being connected to a tower via a yaw arrangement, the load carrying structure carrying the at least two energy generating units; and
   a multirotor turbine controller configured to:
      receive an input indicating a requirement to a change in operation of at least a first of the energy generating units, wherein the change in operation indicates that the first energy generating unit is to be shut down;
      generate control commands for the first energy generating unit and for at least a second energy generating unit, the first energy generating unit and the second energy generating unit being mounted to the same load carrying structure, the control commands causing the required change in operation, and the control commands causing coordinated operation of at least the first energy generating unit and the second energy generating unit; and
      control the energy generating units in accordance with the generated control commands so that the first energy generating unit as well as the second energy generating unit are shut down,
      wherein the control commands are generated under the constraint that a yaw moment of the yaw arrangement is maintained below a predefined threshold level, and
      wherein the predefined threshold level is selectable from one of a plurality of predefined threshold levels in dependence on at least one of: wind speed, wind direction, gust conditions, turbulence conditions, or an operational state of the energy generating units and/or the multirotor wind turbine.

2. A system for a multirotor wind turbine, the system comprising:
   two or more energy generating units, each energy generating unit comprising a rotor comprising one or more wind turbine blades; and
   a multirotor turbine controller configured to:
      receive an input indicating a requirement to a change in operation of at least a first of the energy generating units, wherein the change in operation indicates that the first energy generating unit is to be shut down;
      generate control commands for the first energy generating unit and for at least a second energy generating unit, the first energy generating unit and the second energy generating unit being mounted to a same load carrying structure, the control commands causing the required change in operation, and the control commands causing coordinated operation of at least the first energy generating unit and the second energy generating unit; and
      control the energy generating units in accordance with the generated control commands so that the first energy generating unit as well as the second energy generating unit are shut down,
      wherein the control commands are generated under the constraint that a yaw moment of the yaw arrangement is maintained below a predefined threshold level, and
   wherein the predefined threshold level is selectable from one of a plurality of predefined threshold levels in dependence on whether the load carrying structure is actively performing a yaw movement such that:
      when the load carrying structure is actively performing the yaw movement, a first predefined threshold level of the plurality of predefined threshold levels is selected as the predefined threshold level, and
      when the load carrying structure is not actively performing the yaw movement, a second predefined threshold level of the plurality of predefined threshold levels is selected as the predefined threshold level.

* * * * *